US011453405B2

(12) United States Patent
Zhang et al.

(10) Patent No.: US 11,453,405 B2
(45) Date of Patent: Sep. 27, 2022

(54) METHOD FOR ASCERTAINING THE POSITION OF THE CENTER OF GRAVITY OF A VEHICLE (71) Applicant: Continental Teves AG & Co. oHG, Frankfurt am Main (DE)

(72) Inventors: Chen Zhang, Frankfurt am Main (DE); Sebastian Bernhard, Darmstadt (DE); Andreas Kuntschar, Frankfurt am Main (DE)

(73) Assignee: Continental Teves AG & Co. oHG

( * ) Notice: Subject to any disclaimer, the term of this patent is extended or adjusted under 35 U.S.C. 154(b) by 32 days.

(21) Appl. No.: 16/649,335

(22) PCT Filed: Sep. 19, 2018

(86) PCT No.: PCT/EP2018/075300
§ 371 (c)(1),
(2) Date: Mar. 20, 2020

(87) PCT Pub. No.: WO2019/063376
PCT Pub. Date: Apr. 4, 2019

(65) Prior Publication Data
US 2020/0231167 A1    Jul. 23, 2020

(30) Foreign Application Priority Data

Sep. 28, 2017   (DE) .................... 10 2017 217 326.2
Nov. 22, 2017   (DE) .................... 10 2017 220 860.0

(51) Int. Cl.
*B60W 40/13*   (2012.01)
*B60W 40/112*  (2012.01)
*B60W 50/00*   (2006.01)

(52) U.S. Cl.
CPC .......... *B60W 40/13* (2013.01); *B60W 40/112* (2013.01); *B60W 2040/1315* (2013.01);
(Continued)

(58) Field of Classification Search
CPC ............... B60W 40/13; B60W 40/112; B60W 2040/1315; B60W 2050/0014;
(Continued)

(56) References Cited

U.S. PATENT DOCUMENTS 7,263,436 B2   8/2007   Verhagen et al.
7,526,376 B2   4/2009   Huang et al.
(Continued)

FOREIGN PATENT DOCUMENTS

CN   104973125 A   * 10/2015   .......... B60W 30/095
CN   106056150 A      10/2016
(Continued)

OTHER PUBLICATIONS

Rajamani et al., IEEE Transactions on Intelligent Transportation Systems, vol. 12, No. 4, Dec. 2011 (Year: 2011).*
(Continued)

*Primary Examiner* — Fadey S. Jabr
*Assistant Examiner* — Naeem Taslim Alam
(74) *Attorney, Agent, or Firm* — RatnerPrestia (57) ABSTRACT

A method in which the position of the center of gravity of a moving motor vehicle is ascertained, wherein at least one set of related input variables is taken into consideration, and the set of input variables includes at least a longitudinal acceleration of the motor vehicle, a lateral acceleration of the motor vehicle, a yaw rate of the motor vehicle and at least one wheel rotational speed, in particular four wheel rotational speeds, wherein the set of input variables is ascertained during a steady-state driving maneuver, and a quantity of possible center of gravity positions is defined as classes and, by a learning-based classification method, on the basis of the set of input variables, a class is selected which indicates an estimated center of gravity position. A control unit for carrying out the method is also disclosed.

13 Claims, 3 Drawing Sheets

(52) U.S. Cl.
CPC ............... *B60W 2050/0014* (2013.01); *B60W 2520/105* (2013.01); *B60W 2520/125* (2013.01); *B60W 2520/14* (2013.01); *B60W 2520/28* (2013.01); *B60W 2540/18* (2013.01)

(58) Field of Classification Search
CPC ..... B60W 2520/105; B60W 2520/125; B60W 2520/14; B60W 2520/28; B60W 2540/18
See application file for complete search history.

(56) References Cited

U.S. PATENT DOCUMENTS

| | | | |
|---|---|---|---|
| 8,583,354 | B2 | 11/2013 | Klier |
| 8,751,141 | B2 | 6/2014 | Ranc et al. |
| 8,825,286 | B2 | 9/2014 | Kroeger |
| 8,831,874 | B1* | 9/2014 | Pettis ................ G01C 21/3461 701/410 |
| 9,376,119 | B2 | 6/2016 | Kozuka et al. |
| 9,663,115 | B2* | 5/2017 | Singh .................... G01M 17/02 |
| 2003/0195689 | A1* | 10/2003 | Mori .................... G01M 17/007 701/1 |
| 2009/0024269 | A1 | 1/2009 | Shorten et al. |
| 2009/0099718 | A1 | 4/2009 | Kobetz |
| 2009/0177346 | A1 | 7/2009 | Hac |
| 2011/0172877 | A1 | 7/2011 | Dourra et al. |
| 2012/0035786 | A1* | 2/2012 | Yamauchi ............... B62D 37/04 701/2 |
| 2012/0046846 | A1* | 2/2012 | Dollens ................ B60K 17/356 701/99 |
| 2013/0193656 | A1* | 8/2013 | Itoh ...................... B60G 17/005 280/5.509 |
| 2015/0367857 | A1* | 12/2015 | Kozu .................... B60W 40/13 701/70 |
| 2017/0120927 | A1* | 5/2017 | Liu ........................ B60W 50/14 |

FOREIGN PATENT DOCUMENTS

| | | | | |
|---|---|---|---|---|
| DE | 102004056108 | A1 | | 9/2005 |
| DE | 102013211243 | A1 | | 12/2014 |
| DE | 102014200987 | A1 | * | 7/2015 ............ B60W 40/13 |
| DE | 102014200987 | A1 | | 7/2015 |
| DE | 112013006626 | T5 | | 10/2015 |
| WO | 2006061125 | A1 | | 6/2006 |
| WO | 2007098891 | A1 | | 9/2007 |
| WO | 2010034580 | A1 | | 4/2010 |
| WO | WO-2014061108 | A1 | * | 4/2014 ............ B60W 40/13 |

OTHER PUBLICATIONS

Zhang et al., English language translation of DE102014200987A1, EPO (Year: 2014).*
Kato et al., English language translation of WO2014061108A1, EPO (Year: 2014).*
Schiehlen, English language translation of CN 104973125 A, EPO (Year: 2014).*
German Search Report for German Application No. 10 2017 220 860.0, with partial translation, dated Apr. 30, 2018, 8 pages.
International Search Report and Written Opinion for International Application PCT/EP2018/075300, dated Nov. 26, 2018, 8 pages.

* cited by examiner

METHOD FOR ASCERTAINING THE POSITION OF THE CENTER OF GRAVITY OF A VEHICLE

CROSS REFERENCE TO RELATED APPLICATIONS

This application is the U.S. National Phase Application of PCT International Application No. PCT/EP2018/075300, filed Sep. 19, 2018, which claims priority to German Patent Application No. 10 2017 217 326.2, filed Sep. 28, 2017 and German Patent Application No. 10 2017 220 860.0 filed Nov. 22, 2017, the contents of such applications being incorporated by reference herein.

FIELD OF THE INVENTION

The invention relates to a method in which the position of the center of gravity of a moving motor vehicle is ascertained, wherein at least one set of related input variables is taken into consideration. The set of input variables comprises at least a longitudinal acceleration of the motor vehicle, a lateral acceleration of the motor vehicle, a yaw rate of the motor vehicle and at least one wheel rotational speed. The invention also relates to an electronic control unit.

BACKGROUND OF THE INVENTION

In known methods for estimating a center of gravity position, the lateral center of gravity coordinate y is normally disregarded, and the longitudinal corner x is assumed in some cases to be known, or is assumed to be zero. The quality of the estimation of the center of gravity height z is often unsatisfactory.

DE 10 2014 200 987 A1, incorporated herein by reference, has disclosed a method in which the position of the center of gravity of a moving motor vehicle is ascertained, wherein at least two data points from related input variables comprising at least an acceleration of the motor vehicle, wheel speeds of at least two, in particular four, wheels and drive torques or braking torques acting at said wheels are taken into consideration. At least one center of gravity coordinate in a coordinate system fixed in relation to the vehicle, and at least one adaptation parameter of a coefficient of friction characteristic curve, are ascertained jointly.

Known methods have the disadvantage that numerous vehicle parameters have to be known in advance, and an estimation is often performed only for one or two coordinates, not all three spatial coordinates. A common result is low quality of the estimation of the vertical center of gravity coordinate, and the center of gravity coordinates are coupled to one another. Existing learning-based approaches require a very large number of classifiers. In some cases, a high level of processing power is necessitated, which is expensive and often cannot be implemented in the moving vehicle.

SUMMARY OF THE INVENTION

An aspect of the invention is a method for ascertaining a center of gravity position, which method is robust, accurate and independent and which at the same time requires relatively low processing power.

According to an aspect of the invention, the set of input variables is ascertained during a steady-state driving maneuver, and a quantity of possible center of gravity positions is defined as classes and, by means of a learning-based classification method, on the basis of the set of input variables, a class is selected which indicates an estimated center of gravity position.

A set of related input variables is to be understood to mean a data set of various driving dynamics variables which are measured or ascertained simultaneously or which describe the driving state of the motor vehicle at a point in time. The various driving dynamics variables comprise at least a longitudinal acceleration of the motor vehicle, a lateral acceleration of the motor vehicle, a yaw rate of the motor vehicle and at least one wheel rotational speed. The set of input variables preferably comprises four wheel rotational speeds.

The method according to an aspect of the invention has the advantage that no vehicle parameters are required in the estimation algorithm. The number of classifiers and model parameters is considerably reduced. The quality of the estimation of the vertical center of gravity coordinate is improved. The method achieves increased robustness with respect to measurement noise, in particular zero-mean measurement noise. Furthermore, a high level of robustness with respect to offset of the mass estimator and the roadway coefficient of friction is realized.

It is preferable for multiple wheel rotational speeds to be detected, particularly preferably one wheel rotational speed for each wheel of the vehicle. If multiple wheel rotational speeds are detected, then an average value or weighted average value of the wheel rotational speeds is advantageously calculated. The average value or weighted average value of the wheel rotational speeds is used as an input variable (average wheel rotational speed). An average value or weighted average value is more robust with respect to measurement errors than a single wheel rotational speed.

It is preferable if a non-linear assignment between sets of input variables and classes of center of gravity positions is learned using simulation data of a model of the motor vehicle. Here, a non-linear assignment is to be understood to mean an assignment in which there is assumed to be no proportional relationship between input variables and coordinates of the center of gravity position.

The learning-based classification algorithm is used to replicate a non-linear assignment between driving dynamics data (standard ESP sensor data) and associated center of gravity positions. The assignment is performed preferably by means of a training process, during which simulation data is generated. Subsequently, a random forest classifier, for example, may be used for the estimation of the x and y coordinates.

Preferably, during the training process, a space of possible center of gravity positions is defined, and a quantity of center of gravity positions to be learned is defined as classes. The non-linear assignment between sensor data and associated center of gravity positions is preferably learned using simulation data of a model of the target vehicle. Here, a classification method is preferably used which provides an output of the probability of each individual class. The random forest method is advantageously expedient. Alternatively, an import vector machine may be used.

After completion of the training process, the method for ascertaining the center of gravity position of a motor vehicle can be implemented. The classification method is preferably implemented in a classifier which carries out classifications on the basis of the assignments learned in the training process.

The set of input variables preferably comprises a steering angle.

The set of input variables preferably comprises an estimated value of a total mass of the motor vehicle.

Instead of the total mass of the motor vehicle, an estimated value of a payload mass may be entered as an input variable into the calculation. The total mass and the payload mass can be converted into one another with knowledge of the empty mass of the motor vehicle.

The input variables are preferably the continuous sensor signals longitudinal and lateral acceleration, yaw rate, steering angle and at least one, but ideally all four, wheel rotational speeds and an estimated value for the current total mass of the vehicle.

The longitudinal acceleration of the motor vehicle, the lateral acceleration of the motor vehicle, the yaw rate of the motor vehicle and the wheel rotational speed are preferably detected by means of a sensor arrangement of a driving stability system. The use of measurement variables which are already detected by the driving stability system and its ESP standard sensor arrangement has the advantage that it results in lower outlay for the estimation of the longitudinal and the lateral center of gravity coordinates.

The method is preferably carried out by means of a processing unit which reads out the stated variables at the interface(s) of an ESP control unit.

A steady-state driving maneuver is preferably identified if a vehicle speed, the lateral acceleration and/or yaw rate and/or the steering angle are constant over a predefined period of time.

A steady-state driving maneuver is advantageously identified if a vehicle speed is constant over a predefined period of time, and additionally at least one of the variables lateral acceleration, yaw rate or steering angle is constant over the predefined period of time.

The vehicle speed is particularly preferably determined on the basis of the wheel rotational speed or on the basis of the averaged wheel rotational speed.

Preferably, a steady-state driving maneuvre is identified if, over the predefined period of time:
- the variance of the vehicle speed lies below a first threshold value, and
- the variance of the lateral acceleration lies below a second threshold value, and/or
- the variance of the yaw rate lies below a fourth threshold value, and/or
- the variance of the steering angle lies below a third threshold value.

A driving dynamics variable (lateral acceleration, yaw rate, steering angle) is advantageously considered to be constant over a period of time if the variance of the driving dynamics variable lies below the respective threshold value during the period of time.

Preferably, at least two sets of input variables are taken into consideration for the determination of the center of gravity position, wherein a first set of input variables is ascertained during a first steady-state driving maneuver and a second set of input variables is ascertained during a second steady-state driving maneuver. The use of multiple sets of input variables leads to improved precision of the method.

It is particularly preferable if at least three sets of input variables are taken into consideration for the determination of the center of gravity position, wherein a third set of input variables is ascertained during a third steady-state driving maneuver. This permits a further improvement in precision.

Preferably, by means of the classification method, at least two intermediate results are ascertained on the basis of different sets of input variables.

It is particularly preferable if in each case one intermediate result is ascertained on the basis of the first set of input variables and on the basis of the second set of input variables.

It is particularly preferable if the estimated center of gravity position is calculated on the basis of the at least two intermediate results. The calculation of the estimated center of gravity position is advantageously performed from the intermediate results using a minimum mean square error (MMSE) method.

While the classes represent a discretization of the space, the MMSE estimated value represents the expected value in three-dimensional space and can assume any position, even between the positions of the classes. The position of the center of gravity as ascertained by means of the method preferably corresponds to the estimated center of gravity position calculated by means of MMSE. This permits an offsetting of the intermediate results to give a resulting center of gravity position, which provides particularly accurate results.

It is preferable if a number n (n≥2) of sets of input variables is taken into consideration and an intermediate result is ascertained for each of the sets. The calculation of the estimated center of gravity position is ascertained on the basis of the n intermediate results, preferably by means of a minimum mean square error method.

Particularly preferably, the first driving maneuver differs from the second driving maneuver. The use of different driving maneuvers has proven to be particularly accurate.

It is preferable if each steady-state driving maneuver is classified according to its type into steady-state left-hand corner, steady-state right-hand corner or steady-state straight-ahead driving.

It is preferable if the driving state is checked for a steady state, and its type "steady-state straight-ahead driving", "steady-state left-hand corner" or "steady-state right-hand corner" determined, by means of variance calculation of the accelerations and yaw rate.

The method preferably includes automatic identification of valid steady-state driving maneuvers. The input variables of the identification are the longitudinal and lateral acceleration and also the yaw rate of the vehicle and optionally the steering angle. Each sampling point is checked for a steady state by means of the calculation of the variance of each input variable of the identification in the range of a movable time window and with a threshold value being specified. If a steady state is present, the type of the maneuver is determined on the basis of the yaw rate and/or the lateral acceleration.

This offers the advantage that steady states and the type thereof (straight-ahead driving, left-hand corner, right-hand corner) are automatically identified, and the center of gravity estimation is provided as a feature vector for the further method.

In detail, the maneuvers preferably comprise the steady-state left-hand corner, the steady-state right-hand corner and steady-state straight-ahead driving. Each of these maneuvers is characterized by a constant steering angle, a constant speed and a constant lateral acceleration and yaw rate.

It is particularly preferable if the first steady-state driving maneuver differs in type from the second steady-state driving maneuver. For example, the first steady-state driving maneuver is a steady-state left-hand corner, and the second steady-state driving maneuver is steady-state straight-ahead driving, etc.

In a preferred refinement of an aspect of the invention, by means of the classification method, at least one probability distribution of the classes is determined, which assigns a probability value to each class of center of gravity positions.

Owing to the spatial distribution of the classes, the output of the classifier results in a spatial probability distribution whose minimum mean square error (MMSE) represents the estimated value of the center of gravity position.

It is particularly preferable if each intermediate result is present in the form of a probability distribution.

The described classifier is preferably applied in each case for each of the steady-state driving maneuvers used.

It is particularly preferable if in each case one classifier is used for each of the three different steady-state driving maneuvers. The three classifiers provide three probability distributions (one distribution for each maneuver) from which the estimated value for the center of gravity position (x, y, z) emerges through combination and calculation of the minimum mean square error (MMSE).

The spatial probability distribution is preferably combined with the probability distributions of the other driving maneuvers by means of Bayesian inference to form a common probability distribution, and, through subsequent calculation of the expected value, leads to an estimated value for the center of gravity position of the vehicle.

The classification method is preferably a random forest or import vector machine method.

A lateral coordinate and a longitudinal coordinate of the estimated center of gravity position are preferably determined.

A lateral coordinate and a longitudinal coordinate of the estimated center of gravity position are preferably firstly determined by means of the classification method. The lateral and longitudinal coordinates are particularly preferably determined by means of a first partial classifier, for example a random forest classifier. The first partial classifier determines only some of the spatial coordinates: the lateral and longitudinal coordinates, not the vertical coordinate.

A vertical coordinate of the estimated center of gravity position is preferably determined on the basis of the lateral and longitudinal coordinates calculated first.

The determination of the vertical coordinate is particularly preferably performed by means of a further, linear partial classifier, into which the values of the lateral and longitudinal coordinates already determined are entered. This approach simplifies the calculation and therefore takes up less processing power. The linear partial classifier performs a linear classification and, in so doing, calculates the vertical coordinate on the basis of a linear equation. The lateral and longitudinal coordinates are entered as variables into the linear equation and/or input variables of the method, for example the roll angle, are entered as variables. A linear interpolation is performed.

It is advantageous if the first partial classifier determines a probability distribution of the lateral and longitudinal coordinates and the expected values of this probability distribution are taken into consideration by means of the further, linear partial classifier for the determination of the vertical coordinate.

The first partial classifier and the further partial classifier are advantageously constituent parts of the classifier. The classifier thus determines all three spatial coordinates.

The set of input variables preferably comprises a measured or estimated roll angle of the motor vehicle. The roll angle advantageously results from the integration of the measured value of a roll rate sensor.

A set of input variables comprising a roll angle is preferably taken into consideration for the determination of the vertical coordinate of the estimated center of gravity position. The use of the roll angle permits a particularly accurate determination of the vertical coordinate.

The vertical coordinate is advantageously determined by means of a linear partial classifier from expected values of the probability distribution of the lateral and longitudinal coordinates in combination with the roll angle.

For the determination of the spatial center of gravity position, random forest classifiers are advantageously combined with classifiers based on linear interpolation. In steady-state cornering maneuvers, a probability distribution in the longitudinal and lateral directions is provided by a random forest partial classifier, on the basis of which a linear partial classifier estimates the center of gravity height and supplements the two-dimensional probability distribution to give a three-dimensional probability distribution.

According to an aspect of the invention, the electronic control unit comprises a processing unit which carries out a method according to an aspect of the invention.

BRIEF DESCRIPTION OF THE DRAWINGS

Advantageous refinements of aspects of the invention will be discussed below with reference to figures. In the figures.

DETAILED DESCRIPTION OF THE PREFERRED EMBODIMENTS

Figure 1:
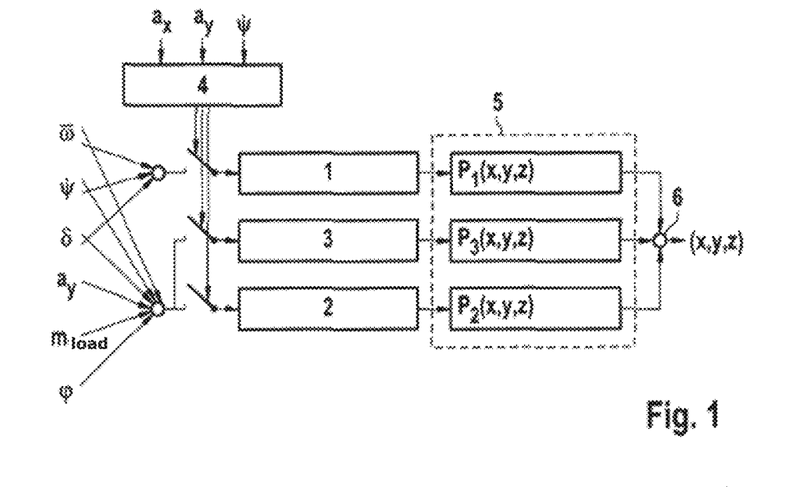
FIG. 1 shows an exemplary schematic sequence of a method.

FIG. 1 schematically illustrates a sequence of a method with input variables $\bar{\omega}$, $\psi$, $\delta$, $a_x$, $a_y$, $m_{load}$, $\varphi$, automatic identification of a valid driving maneuver, and averaging of the noisy signals and storage of the spatial probability distributions in a buffer 5.

The input variables are for example the signals of average value of the wheel rotational speeds $\bar{\omega}$, yaw rate $\psi$, steering angle $\delta$, longitudinal and lateral acceleration $a_x$, $a_y$, estimated value of the vehicle mass $m_{load}$ and roll angle $\phi$.

An automatic identification 4 of a valid driving maneuver is performed. The driving state of the motor vehicle is monitored on the basis of the input variables of yaw rate $\psi$, longitudinal acceleration $a_x$ and lateral acceleration $a_y$. If the yaw rate $\psi$, longitudinal acceleration $a_x$ and lateral acceleration $a_y$ are constant over a predefined time interval, a first steady-state driving maneuver is identified. Preferably, a steady-state driving maneuver is identified if the longitudinal acceleration $a_x$ is zero or approximately zero, whereby a constant speed can be inferred.

Additionally, the steering angle $\delta$ may also be monitored, and a driving maneuver identified as being steady-state only if the steering angle $\delta$ is also constant. Alternatively, the monitoring of the steering angle $\delta$ may replace the monitoring of the yaw rate $\psi$.

Here, a value is regarded as constant if the variance of the value remains below a threshold value over the predefined period of time.

On the basis of the values of the yaw rate/i and lateral acceleration $a_y$, it is determined what type of steady-state driving maneuver is present: whether straight-ahead driving, a left-hand corner or a right-hand corner. Depending on the result, a classifier is selected from a straight-ahead driving classifier 1, a right-hand corner classifier 2 or a left-hand corner classifier 3, and the method proceeds with the selected classifier.

For example, the average wheel rotational speed $\bar{\omega}$, the yaw rate $\psi$ and the steering angle $\delta$ are entered into the straight-ahead driving classifier 1.

For example, the lateral acceleration $a_y$, the estimated value of the vehicle mass $m_{load}$ and the roll angle $\varphi$ are also entered into the right-hand corner classifier 2 and left-hand corner classifier 3 in addition to the average wheel rotational speed $\bar{\omega}$, yaw rate $\psi$ and steering angle $\delta$.

By means of the selected classifier 1, 2 or 3, a probability distribution $P_i(x, y, z)$ is calculated as an intermediate result and stored in the buffer 5. The index i corresponds to the selected classifier 1, 2 or 3.

As soon as the first steady-state driving maneuver has ended, the monitoring of the driving state of the motor vehicle is continued and further steady-state driving maneuvers are identified. For each detected steady-state driving maneuver, a new probability distribution $P_i(x, y, z)$ is calculated and stored in the buffer 5.

Preferably, for each type of steady-state driving maneuver, a maximum number k of probability distributions $P_i(x, y, z)$ is stored in the buffer 5. For example, it is in particular the case that, for each type of steady-state driving maneuver, exactly one probability distribution $P_i(x, y, z)$ is stored in the buffer 5.

If a probability distribution is calculated for a new steady-state driving maneuver, for the type of which the maximum number of probability distributions is already stored in the buffer 5, then a probability distribution that has already been stored is replaced with the new probability distribution. For example, it is thus the case that a maximum of three different steady-state driving maneuvers are used, one of each type of driving maneuver.

From the probability distributions $P_1(x, y, z)$, $P_2(x, y, z)$, $P_3(x, y, z)$ stored in the buffer 5, an estimated center of gravity position (x, y, z) is calculated by means of a minimum square error calculation 6.

The probability distributions $P_1(x, y, z)$, $P_2(x, y, z)$, $P_3(x, y, z)$ in the buffer 5 are combined with one another in accordance with the formula of a Bayesian filter. The minimum square error estimated value is calculated from the resulting common probability distribution P(x, y, z).

A recalculation of the estimated center of gravity position (x, y, z) is preferably performed after every newly identified steady-state driving maneuver.

The method is advantageously ended, and no new calculation of the estimated center of gravity position (x, y, z) performed, if a termination criterion is met.

Figure 2:
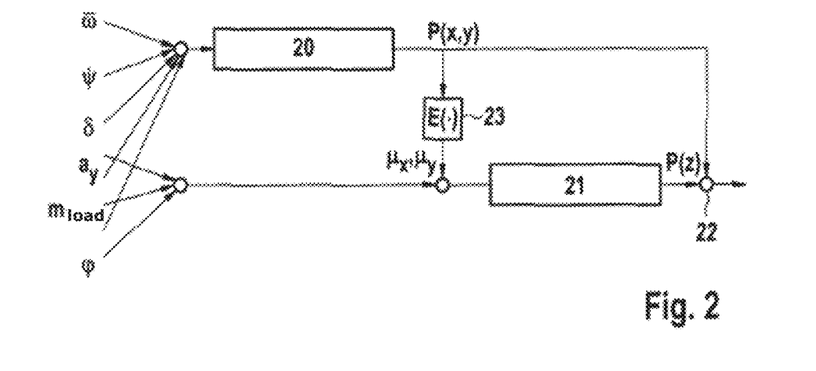
FIG. 2 shows an internal structure of an exemplary classifier.

The internal structure of the classifiers 1, 2, 3 listed in FIG. 1 is illustrated in FIG. 2. Each of the classifiers 1, 2, 3 has such a structure, for example.

For example, the detected values of the wheel rotational speed $\bar{\omega}$, the yaw rate $\psi$, the steering angle $\delta$ and the lateral acceleration $a_y$ are each averaged during a detected steady-state driving maneuver, and the respective averaged value is used as an input variable.

For example, the detected value of the roll angle $\varphi$ and/or the estimated value of the vehicle mass $m_{load}$ are also averaged in each case.

After the averaging of the signals in the steady state, the resulting feature vector, which comprises the wheel rotational speed $\bar{\omega}$, the yaw rate $\psi$, the steering angle $\delta$ and the lateral acceleration $a_y$, and an estimated value of the vehicle mass $m_{load}$, are made available to a random forest partial classifier 20. The random forest partial classifier 20 ascertains a probability distribution P(x, y) of the center of gravity position in the longitudinal and lateral directions.

In a processing step 23, the expected values $\mu_x$, $\mu_y$ of the probability distribution P(x, y) are determined. $\mu_x$ is the expected value of the distribution in the longitudinal direction, and $\mu_y$ is that in the lateral direction.

On the basis of the expected values $\mu_x$, $\mu_y$ of the probability distribution P(x, y) and taking into consideration the lateral acceleration $a_y$, the estimated vehicle mass $m_{load}$ and the roll angle $\varphi$, the probability distribution in the vertical direction P(z) is determined by means of a linear partial classifier 21. The probability distribution for a driving maneuver P(x, y, z) is obtained by combining the two results. The probability distribution obtained is stored in buffer 5.

Figure 3:
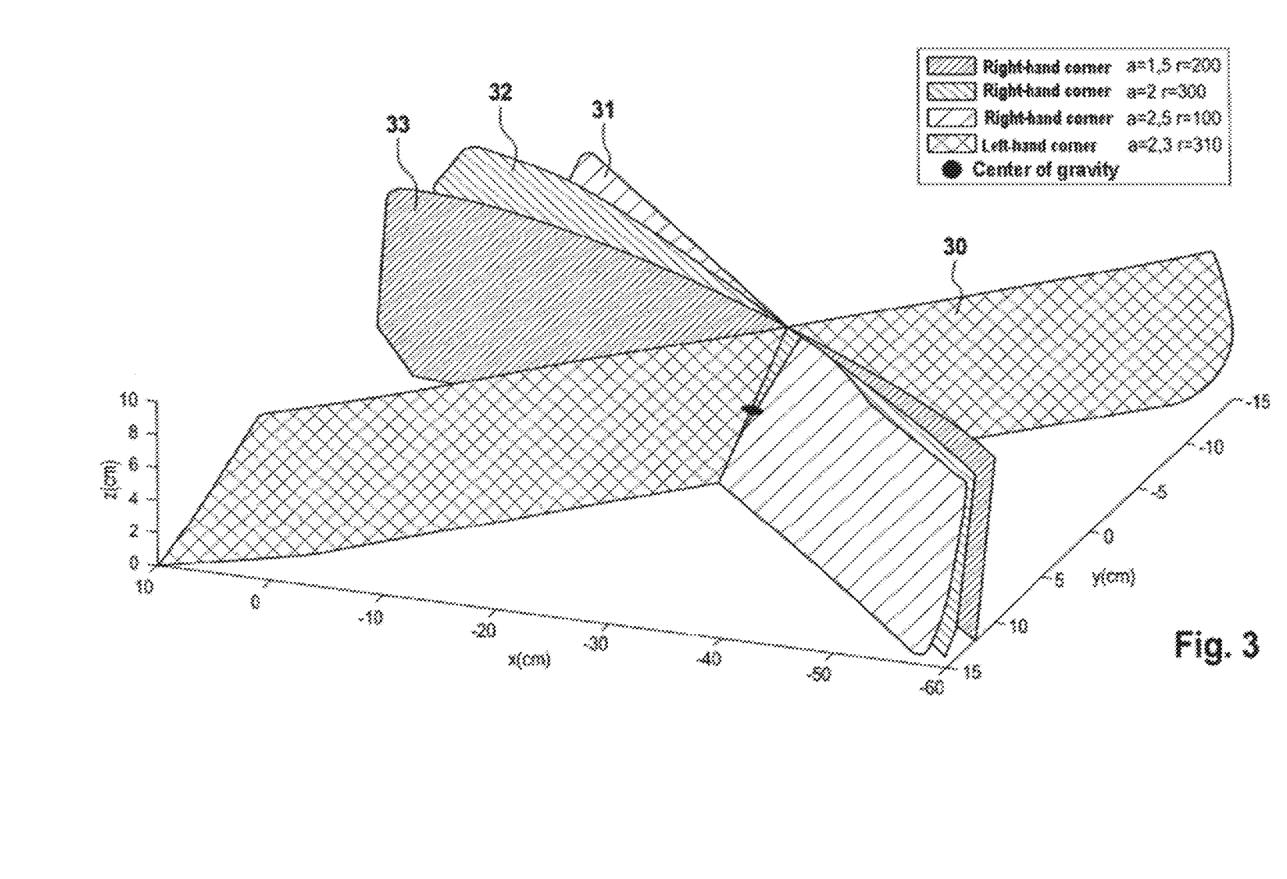
FIG. 3 is a three-dimensional illustration of the information content of exemplary steady-state driving maneuvers.

FIG. 3 graphically shows the information content of exemplary steady-state driving maneuvers. In the three-dimensional space of possible center of gravity positions, the steering angle $\delta$, as the strongest feature, describes a line of intersection between the surfaces of possible center of gravity positions for right-hand corners (31, 32, 33) and a left-hand corner (30), which line runs exactly through the center of gravity. The center of gravity height is subsequently determined using the roll angle $\varphi$.

Figure 4:
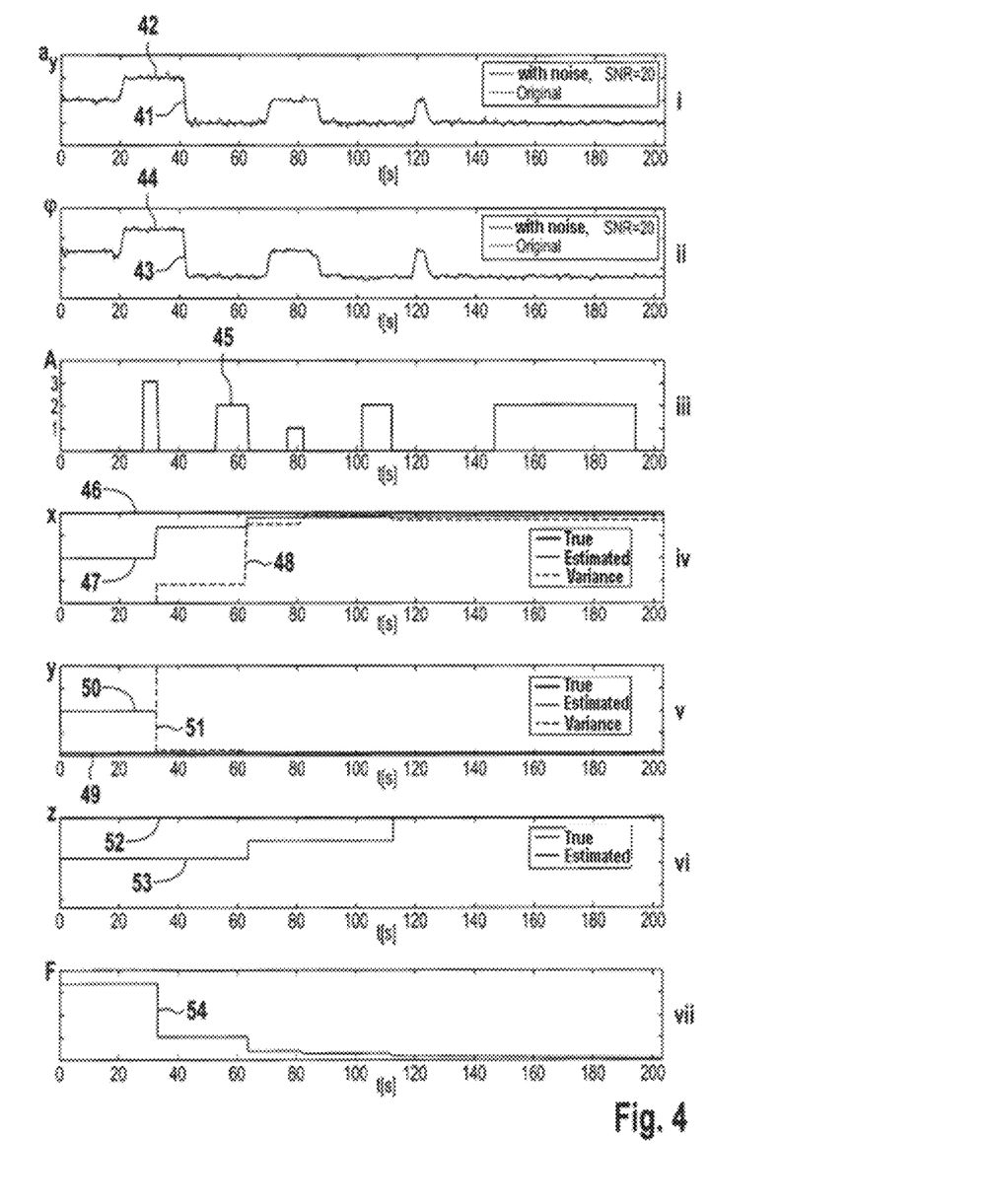
FIG. 4 shows an evaluation of a center of gravity estimation example.

FIG. 4 shows the evaluation of an exemplary center of gravity estimation by means of the exemplary method. A winding route is simulated using a simulation program known per se. The measurement signals are superimposed with Gaussian noise, for example with the signal-to-noise ratio SNR=20 dB. The lateral acceleration $a_y$ and the roll angle $\varphi$ are shown with and without measurement noise. The time t is plotted on the abscissa of all diagrams i-vii.

The first diagram (i) illustrates a simulated lateral acceleration profile 41, and the same profile with superimposed noise 42. The second diagram (ii) illustrates a simulated roll angle profile 43, and the same profile with superimposed noise 44. The state identification and the center of gravity estimation are performed on the basis of the noisy signals.

The state identification 4 identifies steady-state driving maneuvers and classifies these in accordance with their type A. In the third diagram (iii), the result of the identification is plotted as profile 45. Here, the identified type A is depicted on the ordinate as a value (1: straight-ahead driving, 2: right-hand corner and 3: left-hand corner). In this example, five steady-state maneuvers are correctly identified: left-hand corner, right-hand corner, straight-ahead driving, right-hand corner, right-hand corner.

While a steady-state maneuver is taking place, the signals are averaged in each case and, at the end of a maneuver, are passed to the respective classifiers 1, 2, 3 as a single feature vector of input variables. In this example, a total of five classifications are performed, corresponding to the five successive steady-state driving maneuvers identified. The MMSE estimated value (x, y, z) is used for the center of gravity estimation.

The components of the MMSE estimated value x, y and z are illustrated in the diagrams iv-vi. In each time step, these result from the combination of the probability distributions $P_i(x, y, z)$ from the buffer 5. The diagrams iv-vi plot the true value of the respective coordinate (the value assumed for the example) x 46, y 49, z 52 and the profile of the value x 47, y 50, z 53 estimated by the method. The profile of the variance of the probability distribution x 48, y 51 is also plotted in each case for the longitudinal coordinate x and the lateral coordinate y.

At the start of the method, the probability distributions for all coordinates in buffer 5 correspond to an equal distribution, in which all classes of center of gravity positions are assumed to be equally probable. This results in an MMSE estimated value (x, y, z) in the middle of the range of possible center of gravity positions.

After the first left-hand corner in the example, the probability distribution $P_3(x, y, z)$ for this left-hand corner is stored in the buffer 5 and the x and y components 47, 50 approach the true value 46, 49. The classification results of the subsequent steady-state maneuvers are also entered into the buffer 5. An estimation error F, the profile of which is plotted in diagram vii, decreases with each new steady-state driving maneuver and the associated classification.

The termination criterion for the method is preferably considered to be met if the estimation error F falls below an error threshold value.

The invention claimed is:

1. A method in which a position of a center of gravity of a moving motor vehicle is ascertained, the method comprising:
   determining, by a motor vehicle processor, at least one set of input variables received from vehicle sensors during one of a plurality of different types of steady-state driving maneuvers including a steady-state left-hand corner maneuver, a steady-state right-hand corner maneuver and a steady-state straight-ahead driving maneuver, the at least one set of input variables comprising at least a longitudinal acceleration of the motor vehicle, a lateral acceleration of the motor vehicle, a yaw rate of the motor vehicle, and at least one wheel rotational speed;
   selecting, by the motor vehicle processor, a selected one of a plurality of classifiers based on a corresponding one of the plurality of different types of steady-state driving maneuvers, the selecting including:
   a) selecting a steady-state left-hand corner classifier when the set of input variables correspond to a steady-state left-hand corner maneuver, the steady-state left-hand corner classifier providing a first probability distribution for center of gravity positions during the steady-state left-hand corner maneuver, the steady-state left-hand corner classifier indicating an estimated center of gravity position of the motor vehicle based on the at least one set of input variables and the first probability distribution,
   b) selecting a steady-state right-hand corner classifier when the set of input variables correspond to a steady-state right-hand corner maneuver, the steady-state right-hand corner classifier providing a second probability distribution for center of gravity positions during the steady-state right-hand corner maneuver, the steady-state right-hand corner classifier indicating an estimated center of gravity position of the motor vehicle based on the at least one set of input variables and the second probability distribution, and
   c) selecting a steady-state straight-ahead driving classifier when the set of input variables correspond to a steady-state straight-ahead driving maneuver, the steady-state straight-ahead driving classifier providing a third probability distribution for center of gravity positions during the straight-ahead driving maneuver, the steady-state straight-ahead driving classifier indicating an estimated center of gravity position of the motor vehicle based on the at least one set of input variables and the third probability distribution;
   calculating, by the motor vehicle processor, a plurality of estimated center of gravity positions based on the at least one set of input variables and based on the selected one of the plurality of classifiers; and
   controlling, by the motor vehicle processor, an operation of at least one of a braking system or a steering system of the motor vehicle based on the plurality of estimated center of gravity positions.

2. The method as claimed in claim 1, wherein a non-linear assignment between sets of input variables and the plurality of center of gravity positions is learned using simulation data of a model of the motor vehicle.

3. The method as claimed in claim 1, wherein the at least one set of input variables comprises a steering angle and/or the at least one set of input variables comprises an estimated value of a total mass of the motor vehicle and/or the at least one set of input variables comprises a measured or estimated roll angle.

4. The method as claimed in claim 1, wherein a steady-state driving maneuver is identified if a vehicle speed and also the lateral acceleration and/or the yaw rate and/or the steering angle are constant over a predefined period of time, wherein:
   the vehicle speed is regarded as constant if a variance of the vehicle speed lies below a first threshold value,
   the lateral acceleration is regarded as constant if a variance of the lateral acceleration lies below a second threshold value,
   the yaw rate is regarded as constant if a variance of the yaw rate lies below a fourth threshold value, and
   the steering angle is regarded as constant if a variance of the steering angle lies below a third threshold value.

5. The method as claimed in claim 1, wherein, by a classification method, at least two intermediate results are ascertained on the basis of different sets of input variables, and the estimated center of gravity position is calculated on the basis of the at least two intermediate results.

6. The method as claimed in claim 1, wherein at least two sets of input variables are taken into consideration to determine each estimated center of gravity position of the plurality of estimated center of gravity positions, wherein a first set of input variables is ascertained during a first steady-state driving maneuver and a second set of input variables is ascertained during a second steady-state driving maneuver, and the first steady-state driving maneuver differs in type from the second steady-state driving maneuver.

7. The method as claimed in claim 1, wherein, by a classification method, at least one probability distribution of the plurality of estimated center of gravity positions is determined, which assigns a probability value to each of the plurality of estimated center of gravity positions.

8. The method as claimed in claim 1, wherein, in order to calculate each estimated center of gravity position of the plurality of estimated center of gravity positions, firstly a lateral coordinate and a longitudinal coordinate of the respective estimated center of gravity position are determined, and subsequently a vertical coordinate of the respective estimated center of gravity position is determined on the basis of the lateral and longitudinal coordinates.

9. The method as claimed in claim 1, wherein a set of input variables comprising the roll angle is taken into consideration for determining a vertical coordinate of each estimated center of gravity position of the plurality of estimated center of gravity positions.

10. An electronic control unit, for a motor vehicle, comprising:
    a vehicle processor configured to:

determine at least one set of input variables received from vehicle sensors during one of a plurality of different types of steady-state driving maneuvers including a steady-state left-hand corner maneuver, a steady-state right-hand corner maneuver and a steady-state straight-ahead driving maneuver, the at least one set of input variables comprising at least a longitudinal acceleration of the motor vehicle, a lateral acceleration of the motor vehicle, a yaw rate of the motor vehicle, and at least one wheel rotational speed;

select a selected one of a plurality of classifiers based on a corresponding one of the plurality of different types of steady-state driving maneuvers, the selecting including:
  a) selecting a steady-state left-hand corner classifier when the set of input variables correspond to a steady-state left-hand corner maneuver, the steady-state left-hand corner classifier providing a first probability distribution for center of gravity positions during the steady-state left-hand corner maneuver, the steady-state left-hand corner classifier indicating an estimated center of gravity position of the motor vehicle based on the at least one set of input variables and the first probability distribution,
  b) selecting a steady-state right-hand corner classifier when the set of input variables correspond to a steady-state right-hand corner maneuver, the steady-state right-hand corner classifier providing a second probability distribution for center of gravity positions during the steady-state right-hand corner maneuver, the steady-state right-hand corner classifier indicating an estimated center of gravity position of the motor vehicle based on the at least one set of input variables and the second probability distribution, and
  c) selecting a steady-state straight-ahead driving classifier when the set of input variables correspond to a steady-state straight-ahead driving maneuver, the steady-state straight-ahead driving classifier providing a third probability distribution for center of gravity positions during the straight-ahead driving maneuver, the steady-state straight-ahead driving classifier indicating an estimated center of gravity position of the motor vehicle based on the at least one set of input variables and the third probability distribution;

calculate a plurality of estimated center of gravity positions based on the at least one set of input variables and based on the selected one of the plurality of classifiers; and control an operation of at least one of a braking system or a steering system of the motor vehicle based on the plurality of estimated center of gravity positions.

11. The method as claimed in claim 1, wherein in order to calculate each estimated center of gravity position of the plurality of estimated center of gravity positions, at least two intermediate results are ascertained on the basis of different sets of input variables, and the respective estimated center of gravity position is calculated on the basis of the at least two intermediate results by a minimum mean square error method.

12. The method as claimed in claim 1, wherein, by a random forest or import vector machine method, at least one probability distribution of the plurality of estimated center of gravity positions is determined, which assigns a probability value to each of the plurality of estimated center of gravity positions.

13. The method as claimed in claim 1, wherein in order to calculate each estimated center of gravity position of the plurality of estimated center of gravity positions, firstly a lateral coordinate and a longitudinal coordinate of the respective estimated center of gravity position are determined, and subsequently a vertical coordinate of the respective estimated center of gravity position is determined on the basis of the lateral and longitudinal coordinates, by a linear classification.

\* \* \* \* \*